US012632397B2

(12) United States Patent
Shicht et al.

(10) Patent No.: US 12,632,397 B2
(45) Date of Patent: May 19, 2026

(54) PERIPHERAL DEVICE WITH RELAXED-ORDER BUS INTERFACE

(71) Applicant: MELLANOX TECHNOLOGIES, LTD., Yokneam (IL)

(72) Inventors: Yuval Shicht, Tel Aviv (IL); Daniel Marcovitch, Yokneam Illit (IL); Noam Bloch, Bat Shlomo (IL); Mark Hummel, Franklin, MA (US)

(73) Assignee: Mellanox Technologies, Ltd, Yokneam (IL)

( * ) Notice: Subject to any disclaimer, the term of this patent is extended or adjusted under 35 U.S.C. 154(b) by 91 days.

(21) Appl. No.: 18/591,008

(22) Filed: Feb. 29, 2024

(65) Prior Publication Data

US 2025/0278373 A1     Sep. 4, 2025

(51) Int. Cl.
*G06F 9/38* (2018.01)
*G06F 13/10* (2006.01)
*G06F 13/42* (2006.01)

(52) U.S. Cl.
CPC ........ *G06F 13/102* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 6,112,019 | A * | 8/2000 | Chamdani | G06F 9/3838 712/214 |
| 6,804,815 | B1 * | 10/2004 | Kerr | H04L 49/90 718/107 |
| 6,832,367 | B1 * | 12/2004 | Choi | G06F 11/3636 717/124 |
| 11,397,682 | B2 | 7/2022 | Marcovitch et al. | |
| 11,403,250 | B2 * | 8/2022 | Cheng | G06F 13/4027 |
| 2013/0114598 | A1 * | 5/2013 | Schrum | H04L 45/22 370/392 |
| 2022/0327074 | A1 * | 10/2022 | Jeon | G06F 1/3275 |
| 2023/0239252 | A1 * | 7/2023 | Kolor | H04L 47/39 370/320 |
| 2023/0421545 | A1 * | 12/2023 | Shanbhogue | H04L 63/0457 |
| 2024/0036956 | A1 * | 2/2024 | Long | G06F 8/456 |
| 2024/0080379 | A1 | 3/2024 | Friedman et al. | |
| 2024/0119020 | A1 * | 4/2024 | Scott | G06F 13/4282 |

(Continued)

OTHER PUBLICATIONS

Infiniband Trade Association, "InfiniBandTM Architecture Specification", vol. 1, Release 1.3, pp. 1-1842, Mar. 3, 2015.

(Continued)

*Primary Examiner* — Hyun Nam
(74) *Attorney, Agent, or Firm* — Meitar Patents Ltd.; Daniel Kligler

(57) ABSTRACT

A peripheral device includes a bus interface and circuitry. The bus interface is to exchange bus transactions over a peripheral bus that permits out-of-order transfer of at least some of the bus transactions. The circuitry is to generate a plurality of streams of the bus transactions, to select, from among the plurality of streams, one or more streams for which transaction ordering is required, to enforce the transaction ordering among the bus transactions of the selected streams, and to send the bus transactions via the bus interface to the peripheral bus.

16 Claims, 8 Drawing Sheets

(56)     References Cited

U.S. PATENT DOCUMENTS

| 2024/0143527 | A1  |  5/2024 | Marcovitch et al. | |
|---|---|---|---|---|
| 2024/0143539 | A1  |  5/2024 | Marcovitch et al. | |
| 2024/0403048 | A1* | 12/2024 | Agarwal | G06F 9/30043 |
| 2025/0097167 | A1* |  3/2025 | Granovsky | G06F 12/023 |
| 2025/0200859 | A1* |  6/2025 | Damani | G06F 9/3887 |

OTHER PUBLICATIONS

Mellanox Technologies, "CORE-Direct—The Most Advanced Technology for MPI/SHMEM Collectives Offloads," Technology Brief, pp. 1-2, May 2010.

\* cited by examiner

PERIPHERAL DEVICE WITH RELAXED-ORDER BUS INTERFACE

FIELD OF THE INVENTION

The present invention relates generally to computing systems that communicate over peripheral buses, and particularly to methods and systems for applying ordering among peripheral-bus transactions.

BACKGROUND OF THE INVENTION

Computing systems often comprises a peripheral device that is connected to a host or other processing peripheral bus. Peripheral devices may device via a comprise, for example, network adapters, storage devices, accelerators and Graphics Processing Units (GPUs). Peripheral buses, also referred to as system buses, may comprise, for example, Peripheral Component Interconnect Express (PCIe), Advanced Extensible Interface (AXI), Compute Express Link (CXL), Nvlink or Nvlink Chip-to-Chip (Nvlink-C2C).

SUMMARY OF THE INVENTION

An embodiment of the present invention that is described herein provides a peripheral device including a bus interface and circuitry. The bus interface is to exchange bus transactions over a peripheral bus that permits out-of-order transfer of at least some of the bus transactions. The circuitry is to generate a plurality of streams of the bus transactions, to select, from among the plurality of streams, one or more streams for which transaction ordering is required, to enforce the transaction ordering among the bus transactions of the selected streams, and to send the bus transactions via the bus interface to the peripheral bus.

In some embodiments, the circuitry is to enforce the transaction ordering in a selected stream by inserting one or more fence commands into the bus transactions of the selected stream. In a disclosed embodiment, one or more of the fence commands are stream-specific fence commands that apply only to a selected stream. In another embodiment, in response to detecting that a number of currently-processed fence commands exceeds a defined maximal number, the circuitry is to stall processing of any stream requires that insertion of a new fence command. In alternative embodiments, the circuitry is to enforce the transaction ordering in a selected stream by tagging the bus transactions of the selected stream with a unique tag, and, at a selected time, suspending new bus transactions tagged with the unique tag until previous transactions tagged with the unique tag are acknowledged.

In some embodiments, the circuitry is to assign the streams to two or more groups, and to enforce the transaction ordering among the bus transactions of a given group among the groups. In a disclosed embodiment, the circuitry is to enforce the transaction ordering in the given group by inserting one or more fence commands into the bus transactions of the streams belonging to the given group. In an example embodiment, one or more of the fence commands are group-specific fence commands that apply only to the given group. In a disclosed embodiment, in response to detecting that a number of currently-processed fence commands exceeds a defined maximal number, the circuitry is to stall processing of any group that requires insertion of a new fence command.

In other embodiments, the circuitry is to enforce the transaction ordering in the given group by tagging the bus transactions of the given group with a unique tag, and, at a selected time, suspending new bus transactions tagged with the unique tag until previous transactions tagged with the unique tag are acknowledged.

In an embodiment, the circuitry is to assign the streams to the groups by queuing the bus transactions in two or more queues associated respectively with the two or more groups. In another embodiment, the circuitry is to enforce the transaction ordering by applying one or more intra-group ordering rules to the bus transactions belonging to the given group.

In yet another embodiment, in addition to the transaction ordering within each of the groups, the circuitry is to enforce selective transaction ordering among bus transactions belonging to different groups, in accordance with one or more inter-group ordering rules. In still another embodiment, the circuitry is to assign the streams to the groups in accordance with one or more group assignment rules.

In a disclosed embodiment, the circuitry is to assign the bus transactions to the streams in accordance with more one or stream assignment rules. In an embodiment, the peripheral bus, which permits the out-of-order transfer, comprises two or more separate bus links that each require in-order transfer of at least some of the bus transactions.

In some embodiments, the peripheral device is a network adapter that is to communicate over the peripheral bus with a processing device, for coupling the processing device to a network. In an example embodiment, the circuitry is to send or receive communication packets over the network in accordance with a Remote Direct Memory Access (RDMA) protocol. In some embodiments, the bus interface is to communicate over the peripheral bus with a processing device, and the circuitry is to enforce the transaction ordering in a selected stream by applying one or more ordering rules defined between the peripheral device and a device driver running in the processing device.

There is additionally provided, in accordance with an of embodiment f the present invention, a method including generating, in a peripheral device, a plurality of streams of bus transactions for transmission over a peripheral bus that permits out-of-order transfer of at least some of the bus transactions. One or more streams, for which transaction ordering is required, are selected from among the plurality of streams. The transaction ordering is enforced in the peripheral device among the bus transactions of the selected streams. The bus transactions are sent from the peripheral device to the peripheral bus.

The present invention will be more fully understood from the following detailed description of the embodiments thereof, taken together with the drawings in which:

DETAILED DESCRIPTION OF EMBODIMENTS

Overview

Figure 1:
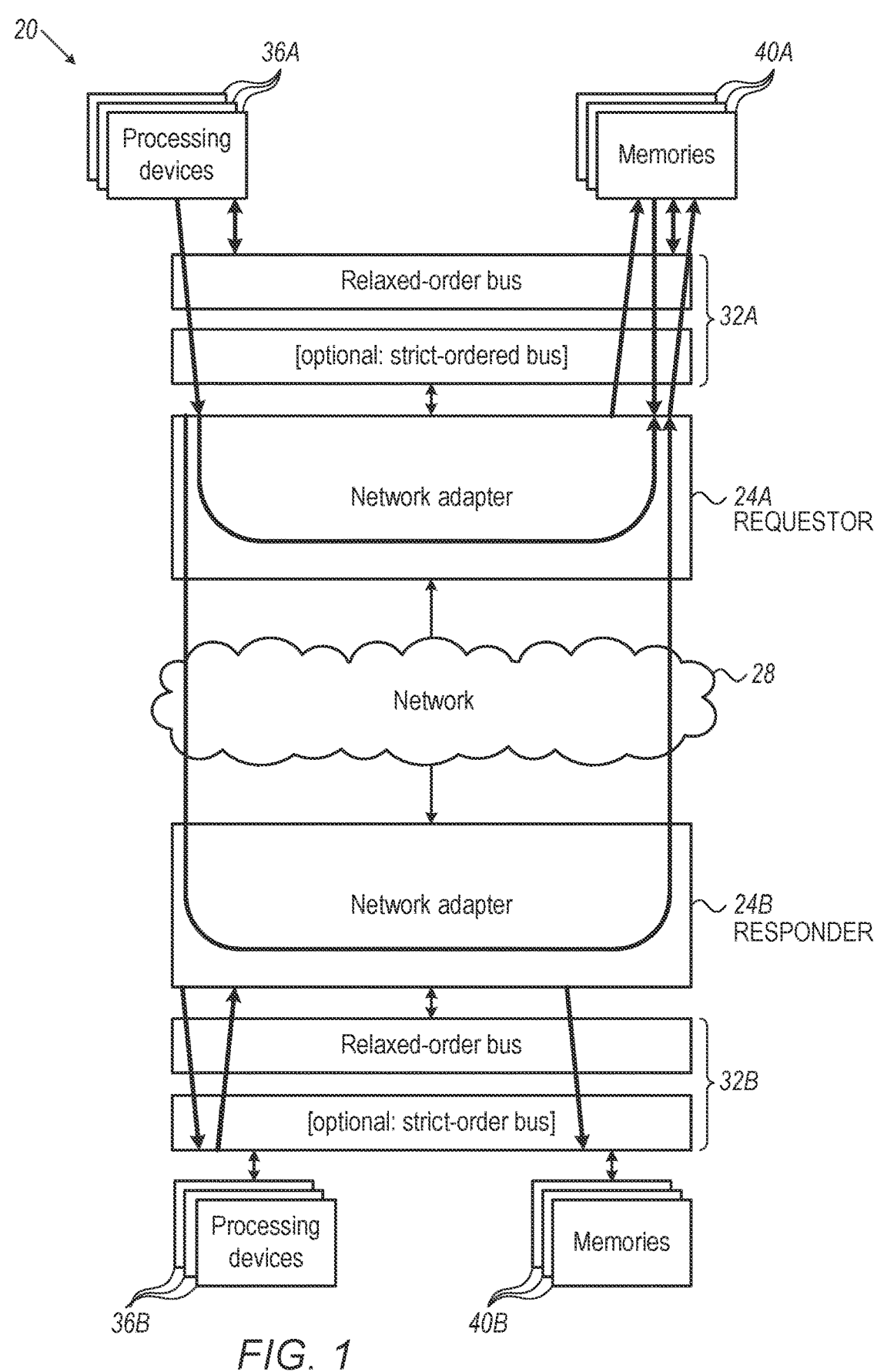
FIG. 1 is a block diagram that schematically illustrates a computing system that uses relaxed-order peripheral buses, in accordance with an embodiment of the present invention.

When a peripheral device communicates with a processing device (e.g., host) over a peripheral bus, certain sequences of bus transactions must be delivered from the peripheral device to the processing device in-order. Consider, for example, a network adapter that connects a host to a network. In one simple example, when executing a certain job for the host, the network adapter writes data to the host memory and then sends a completion notification to the host. To ensure data integrity, the completion notification must not be delivered to the host before the data is completely observable in the host memory. Requirements for in-order delivery over the peripheral bus exist in many other scenarios.

Peripheral buses, however, do not always guarantee unconditional in-order delivery of all bus transactions. Some types of peripheral buses can be regarded as "strict-order" buses, and others as "relaxed-order" buses. PCIe, for example, is relatively strict. Non relaxed order PCIe does not permit a read or write transaction to bypass an earlier write transaction. Nvlink, as an example for a memory interface, on the other hand, is considerably more relaxed with respect to transaction ordering. Some bus types guarantee in-order execution of requests that are addressed to the same address, and others do not have such guarantee.

In practice, there are advantages to using a relaxed-order peripheral bus. For example, a relaxed-order bus may provide lower latency, higher bandwidth, lower cost, and simpler expansion to multiple lanes. To use a relaxed-order bus, however, the in-order delivery requirements imposed by the peripheral device and/or the processing device must be enforced externally to the bus.

One simple solution would be to apply a "fence" or "barrier" between every two bus transactions that need to be delivered in-order. This solution, however, means that only a single outstanding bus transaction is permitted. Since the bus round-trip delay is non-negligible, such a solution would diminish the achievable throughput in a practical system. Another possible solution would be to mark individual bus transactions as "relaxed-order" or "strict-order" and enforce in-order delivery only on the strict-order transactions. This solution, too, incurs a heavy penalty in throughput.

Embodiments of the present invention that are described herein provide improved methods and apparatus for using a relaxed-order peripheral bus, while meeting in-order delivery requirements that are not supported by the bus. The disclosed techniques are typically implemented in the peripheral device, enabling it to serve legacy or conventional processing devices.

In some embodiments described herein, a peripheral device generates multiple streams of bus transactions for sending to a processing device over a relaxed-order peripheral bus. The peripheral device enforces transaction ordering selectively per stream or group of streams. In other words, the peripheral device selects, from among the multiple streams, one or more streams for which transaction ordering is required, and enforces transaction ordering among the bus transactions of the selected streams. The peripheral device may exclude other streams from transaction ordering.

In some embodiments, the peripheral device enforces strict ordering in a given stream (or group of streams) by inserting fence commands between successive transactions of the given stream (or group). The fence commands may be stream-specific fence commands that apply to the given stream, or group-specific fence commands that apply to a group of streams. In an alternative embodiment, the fence commands are global fence commands that apply to all transactions of all streams (but are inserted only between transactions that require strict ordering). In yet other embodiments, the peripheral device enforces strict ordering in a given stream (or group) by tagging the transactions of the given stream (or group) with a unique tag, and, at a selected time, suspending new bus transactions tagged with the unique tag until previous transactions tagged with the unique tag are acknowledged.

In some embodiments, the peripheral device enforces strict ordering per group of streams, by queuing the transactions of each group in a respective queue and applying strict ordering within each queue.

The techniques described herein enable peripheral devices to apply various ordering rules, e.g., intra-stream ordering rules, inter-stream ordering rules, intra-group ordering rules and inter-group ordering rules. Various assignment rules can also be used for choosing how to assign the streams to the groups. Several examples are described.

When using the disclosed techniques, the performance penalties associated with strict ordering are incurred only for streams or groups of streams that actually require in-order delivery. For other streams, the advantages of relaxed-order processing can be gained in full.

System Description

The embodiments described below refer mainly to network devices, and specifically network adapters. The disclosed techniques, however, can be used in various other types of peripheral devices, such as network switches, storage devices, storage controllers, Graphics Processing Units (GPUS) and accelerators. A network adapter is regarded herein as one non-limiting example of a peripheral device.

FIG. 1 is a block diagram that schematically illustrates a computing system 20 that uses relaxed-order peripheral buses, in accordance with an embodiment of the present invention. In the present context, the term "relaxed-order peripheral bus" refers to a peripheral bus that permits out-of-order transfer of at least some of the bus transactions. Typically, a relaxed-order bus has the following characteristics:

Transactions addressed to different addresses are permitted to bypass each other.

The bus supports a fencing/flushing mechanism for ensuring that a write transaction has reached a target ordering domain. The bus may support one or multiple concurrent outstanding fencing/flushing operations. Example configurations include:

All DMA transactions over the bus are non-posted (i.e., an implicit or explicit acknowledgment is sent to the source per DMA transaction).

A special transaction with flush properties can be issued, guaranteeing that all previous transactions have reached the target ordering domain.

In some embodiments, but not necessarily, a relaxed-order bus may already maintain same-address ordering, i.e., guarantee that transactions addressed to the same address are not permitted to bypass one another. In various embodiments, same-address ordering may guarantee that reads and/or writes from addresses with full and/or partial address match follow the following rules: write may not bypass write, read may not bypass write. For example, when the bus enforces same-address ordering with full address match, a write to address 0×4000 with size 0×8 may not bypass another write to address 0×4000 with size 0×8. When the bus enforces same-address ordering with partial address match, a read from address 0×1004 with size 0×8 may not bypass a write to address 0×1000 with size 0×40.

In the present example, system 20 of FIG. 1 comprises two network adapters 24A and 24B that communicate with one another over a network 28. Network adapters 24A and 24B and network 28 may operate in accordance with any suitable network protocol, such as Ethernet or InfiniBand™ (IB). Bold arrows in the figure illustrate the various data paths within and between the network adapters, as described below.

In the present example, network adapters 24A and 24B carry out Remote Direct Memory Access (RDMA) commands, with network adapter 24A serving as a "requestor network adapter" (also referred to herein simply as "requestor") and network adapter 24B serving as a "responder network adapter" (also referred to herein as "responder"). During typical system operation, each of the two network adapters may serve as a requestor for some RDMA commands and as a responder for other commands, or even as both a requestor and a responder in the same transaction ("loopback transaction"). Bold arrows in the figure depict the various paths traversed by the various messages and transactions that make-up the RDMA commands executed by network adapters 24A and 24B, as will be detailed below.

Network adapter 24A (the requestor) serves one or more processing devices 36A, and is coupled to one or more memories 40A. A given processing device 36A typically posts and manages jobs to be executed by network adapter 24A. Jobs may comprise, for example, sending data over network 28, and/or preparing for data to arrive over network 28. Network adapter 24A communicates with processing devices 36A and accesses memories 40A over a peripheral bus 32A. Each processing device 36A may comprise, for example, a host such as a Central Processing Unit (CPU), a GPU, or a peer device such as a Field-Programmable Gate Array (FPGA).

Network adapter 24B, which is also referred to as a "responder network adapter", is coupled to one or more memories 40B. Network adapter 24B accesses memories 40B over a peripheral bus 32B. In some embodiments, although not necessarily, network adapter 24B also communicates with one or more processing devices 36B over bus 32B. On the responder side, the processing devices are considered optional. Each processing device 36B may comprise, for example, a host such as a CPU, a GPU, or a peer device such as an FPGA.

In the present example, memories 40A and 40B may comprise, for example, Random-Access Memory (RAM) devices. Peripheral buses 32A and 32B may comprise relaxed-order buses such as Nylink, Nvlink C2C or PCIe unordered IO (PCIe UIO). Alternatively, either bus 32A or bus 32B may comprise a strict-order bus such as PCIe or CXL. In yet other embodiments, a given network adapter may communicate with a given processing device over one or more relaxed-order buses, over one or more strict-order buses, or over a mixture of one or more relaxed-order buses and one or more strict-order buses.

In one embodiment, a relaxed-order bus is created when a network adapter communicates with a processing device or a memory using two (or more) separate bus links that each require in-order transfer of at least some of the bus transactions. Consider, for example, a network adapter that communicates with a host using two separate PCIe links. Even though each of the individual PCIe links is relatively strict-order, no order is enforced between the PCIe links, and therefore the two links together exhibit relaxed-order behavior.

Example Requestor Operation

Figure 2:
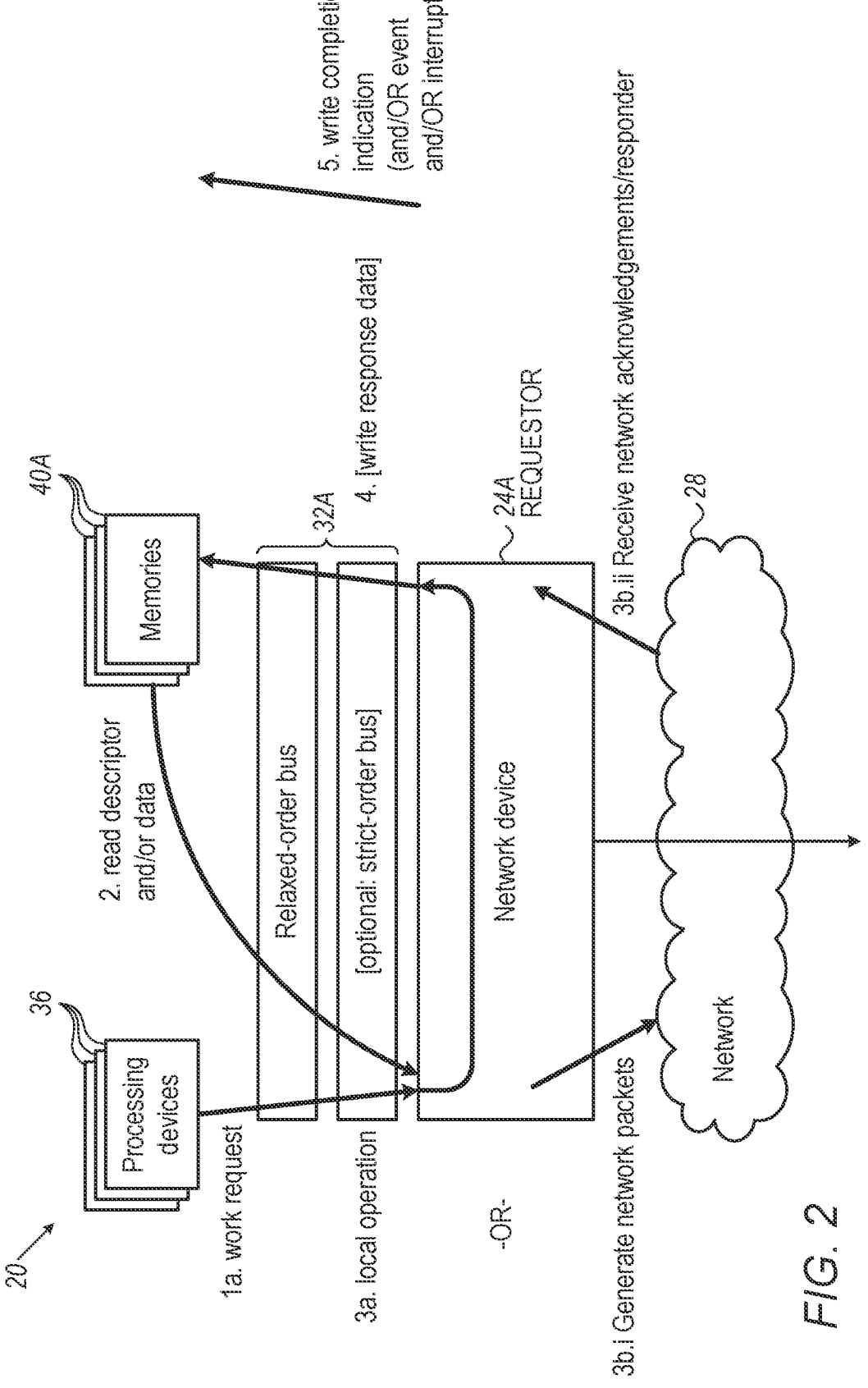
FIG. 2 is a block diagram that schematically illustrates a requestor side of the computing system of FIG. 1, in accordance with an embodiment of the present invention.

FIG. 2 is a block diagram that schematically illustrates the requestor side of system 20 of FIG. 1, in accordance with an embodiment of the present invention. An example flow of operations for the requestor side begins with network adapter 24A receiving a work request from a certain processing device 36. The work request describes the job to be executed.

Executing the job by network adapter 24A comprises:

Local operations (e.g., memory registration, local memory to local memory operation, loopback packets); OR Conversion of remote operations into network packets; AND For reliable protocols, waiting for acknowledgment; AND For a READ/ATOMIC operation—scattering of response data to memory 40A.

After execution, network adapter 24A sends a completion indication to the processing device 36 that requested the job, notifying the processing device that execution is completed. As will be explained below, completion notification may include multiple writes, e.g., a completion entry, an event entry, and an MSI-X write or another interrupt.

Network adapter 24A is used for local operations in various scenarios. For example, the network adapter may comprise one or more accelerators (e.g., copy, compression, etc.). As another example, the network adapter may be connected to multiple disjoint memories (e.g., in a "multi-host" configuration or when a host accesses the network adapter's memory if one exists). As yet another example, the network adapter may be used for sending network packets internally (in a loopback), in which case the internal processing is similar to a network operation but no network packets are visible on external interfaces.

Bold arrows in FIG. 2 illustrate an example of executing a work request by network adapter 24A. The operation comprises the following stages:

Receiving a work request (arrow 1a).

Reading the corresponding descriptor and/or data from memory 40A (arrow 2).

Perform a local operation if required (arrow 3a).

Generate and send network packets comprising the data (arrow 3bi).

Receive an acknowledgement from the responder (arrow 3bii).

Write the response data to memory 40A (arrow 4).

Write completion indication (arrow 5).

Example Responder Operation

Figure 3:
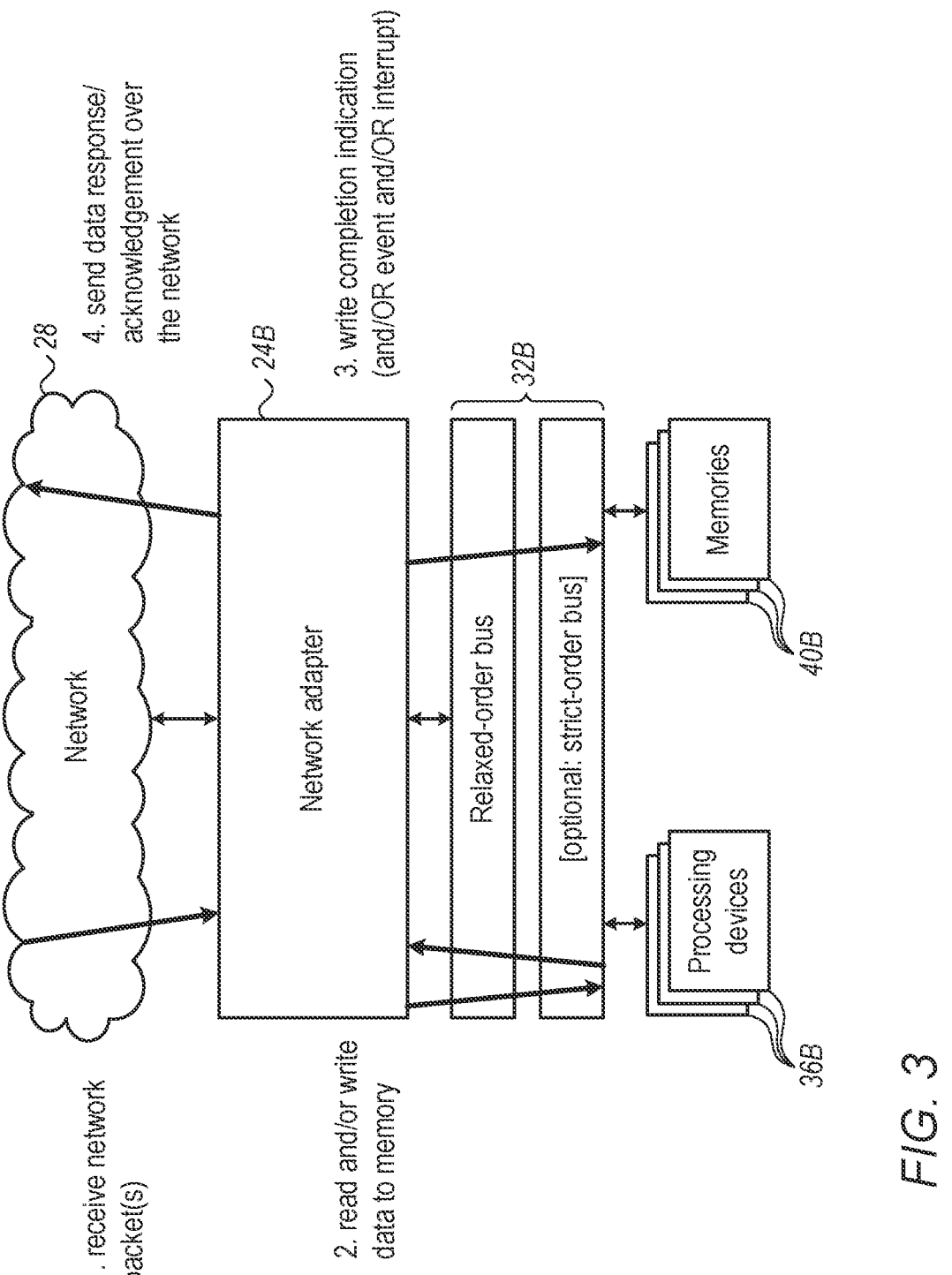
FIG. 3 is a block diagram that schematically illustrates a responder side of the computing system of FIG. 1, in accordance with an embodiment of the present invention.

FIG. 3 is a block diagram that schematically illustrates the responder side of system 20 of FIG. 1, in accordance with an embodiment of the present invention.

In some embodiments, for raw packets or messages, the responder flow is performed by network adapter 24B and comprises:

Scattering of data to memory 40B based on a queue of receive descriptors.

Updating of a completion indication to notify a processing device 36B that the operation is completed. As noted above, the completion indication may include multiple writes, e.g., a completion entry, an event entry and an MSI-X write or other interrupt.

For RDMA READ/WRITE/ATOMIC or similar zero-copy operations, the responder flow includes writes to memory 40B based on packet indications. For reliable transports, the responder flow includes sending of acknowledgements or READ/ATOMIC responses back to the requestor device (network adapter 24A).

Bold arrows in FIG. 3 illustrate an example of a responder flow carried out by network adapter 24B. The flow comprises the following stages:

Receiving network packets over network 28 (arrow 1)

Writing and/or reading data in memory 40B (arrow 2).

Writing completion indication (arrow 3—optional, only for some RDMA transactions).

Sending data response/acknowledgement over network 28 (arrow 4).

Completion Mechanisms

As seen above, the various requestor and responder flows typically involve some sort of completion notification, in which a network adapter notifies a processing device that execution of a requested operation is completed. In various embodiments, network adapters 24A and 24B may use various mechanisms for deciding on completion and for completion notification. Several non-limiting examples of completion mechanisms and completion notification mechanisms are listed below.

Completion counter(s): In some embodiments, one or more work queues are associated with a counter, referred to as a "completion counter". The counter counts the number of completed messages or bytes associated with these queues. This mechanism is sufficient, for example, when the completion is not required to communicate additional metadata. This is the case, for example, in requestor completions, as well as in some responder completions (e.g., if the inbound message size is fixed, or if a message contains its own "message length" indication).

Completion queue(s): One or more work queues (and/or work queue entries) are associated with a completion queue. Relevant requestor or responder work requests trigger a completion queue element (CQE) write to a completion queue (CQ). A "valid" or "ownership" indication is typically defined per CQE. Other implementations may involve a counter indicating the number of CQEs that are valid.

Completion events: In some cases, it is useful to send a single event indicating that several completions are pending. This notification can be performed using similar mechanisms to those described above, e.g., using an event counter or an event queue (EQ), to which event queue elements (EQEs) are posted.

Interrupts: A completion or event mechanism may in turn be connected to an interrupt (e.g., MSI or MSI-X) mechanism. MSI and MSI-X interrupts are typically implemented as a write transaction over the peripheral bus.

In some embodiments, completion notification is implemented using a hierarchy of events: the output(s) of one or more CQs trigger(s) a MSI-X via an EQ mechanism. Alternatively, a CQ (or completion counter) may trigger an MSI-X directly.

Selective Enforcement of Transaction Ordering

The various requestor-side and responder-side flows, such as the example flows described above, comprise sequences of bus transactions that are sent from a network adapter to a processing device over a relaxed-order peripheral bus. In many scenarios, the transactions in the sequence must be visible to the processing device in the same order they are sent to the bus by the network adapter.

In some cases, the ordering requirements originate from rules that are defined between the network adapter and its driver that runs in the processing device. Additionally, or alternatively, ordering requirements may originate from requirements of the communication protocol being implemented, e.g., when implementing RDMA over relaxed-order peripheral bus.

Consider, for example, the process of executing and reporting the completion of a work request by a requestor network adapter. This process may comprise up to four write transactions from the network adapter to the processing device over the peripheral bus:

I. Data write (e.g., READ response or local memory-to-memory operation).

II. Completion notification.

III. Event Queue write (optional).

IV. Interrupt (e.g., MSI-X write) (optional).

These four write transactions are addressed to different addresses but are nevertheless expected to be visible to the processing device in-order. The semantics of the relaxed-order bus may not guarantee in-order delivery of such a sequence.

As another example, some completion notifications may be required to be delivered in-order relative to one another. When using a completion counter mechanism as described above (or a counter indicating the number of valid CQE entries), the completion notifications are addressed to the same address, and therefore some relaxed-order buses will guarantee the required in-order delivery. When using queue-based completions, however, the processing device (e.g., a device driver running on the processing device) may wish to rely on a valid bit of a later completion to conclude that previous completions are already valid. This may not be possible with some relaxed-order buses.

As yet another example, for RDMA READ or ATOMIC responses, the data is written by the network adapter to the processing device's memory and the completion notification indicates arrival of the data. This adds an additional ordering constraint—The completion notification must not be visible on the processing device side before the data has been written in full.

In some embodiments of the present invention, the network adapter employs novel mechanisms for ensuring in-order delivery of selected sequences of bus transactions, to overcome the relaxed ordering semantics of the peripheral bus.

Figure 4:
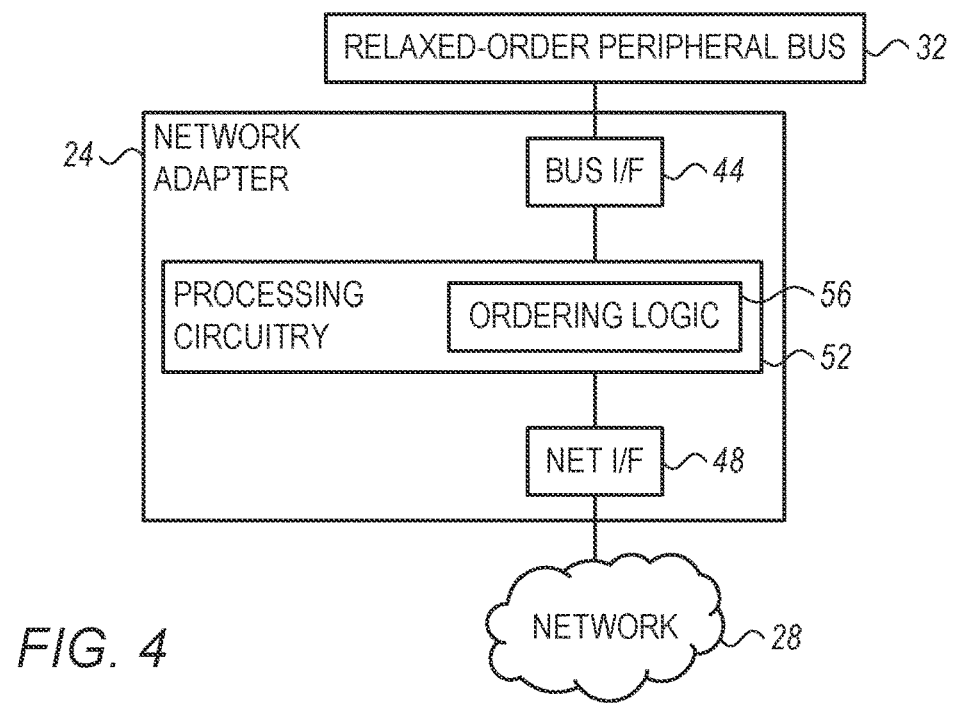
FIG. 4 is a block diagram that schematically illustrates a network adapter, in accordance with an embodiment of the present invention.

FIG. 4 is a block diagram that schematically illustrates the internal configuration of a network adapter 24 (e.g., network adapter 24A or 24B of FIG. 1), in accordance with an embodiment of the present invention. Network adapter 24 comprises a bus interface 44 for communicating bus transactions over a relaxed-order peripheral bus 32, a network interface 48 for communicating network packets over network 28, and processing circuitry 52 that carries out the various processing tasks of the network adapter. Among other components, processing circuitry 52 comprises ordering logic 56. Logic 56 enforces transaction ordering among at least some of the bus transactions communicated over bus 32, using methods that are described in detail below.

In some embodiments, as part of the ongoing operation of network adapter 24, processing circuitry 52 generates streams of bus transactions and sends them using bus interface 44 to peripheral bus 32. Ordering logic 56 selects one or more of the streams of bus transactions, and enforces transaction ordering among the transactions of the selected streams.

The partitioning of the transactions into streams is performed such that there is no need for ordering between transactions belonging to different streams. For example, different host processes (on the processing device) may have independent and isolated clusters of Queue Pairs (QPs), Completion Queues (CQs), etc. In this manner, logic 56 does not apply strict ordering indiscriminately to all the bus transactions, but rather aims to exclude streams that do not require ordering. Such selective ordering reduces the performance (e.g., latency and throughput) degradation caused by strict ordering.

Figure 5:
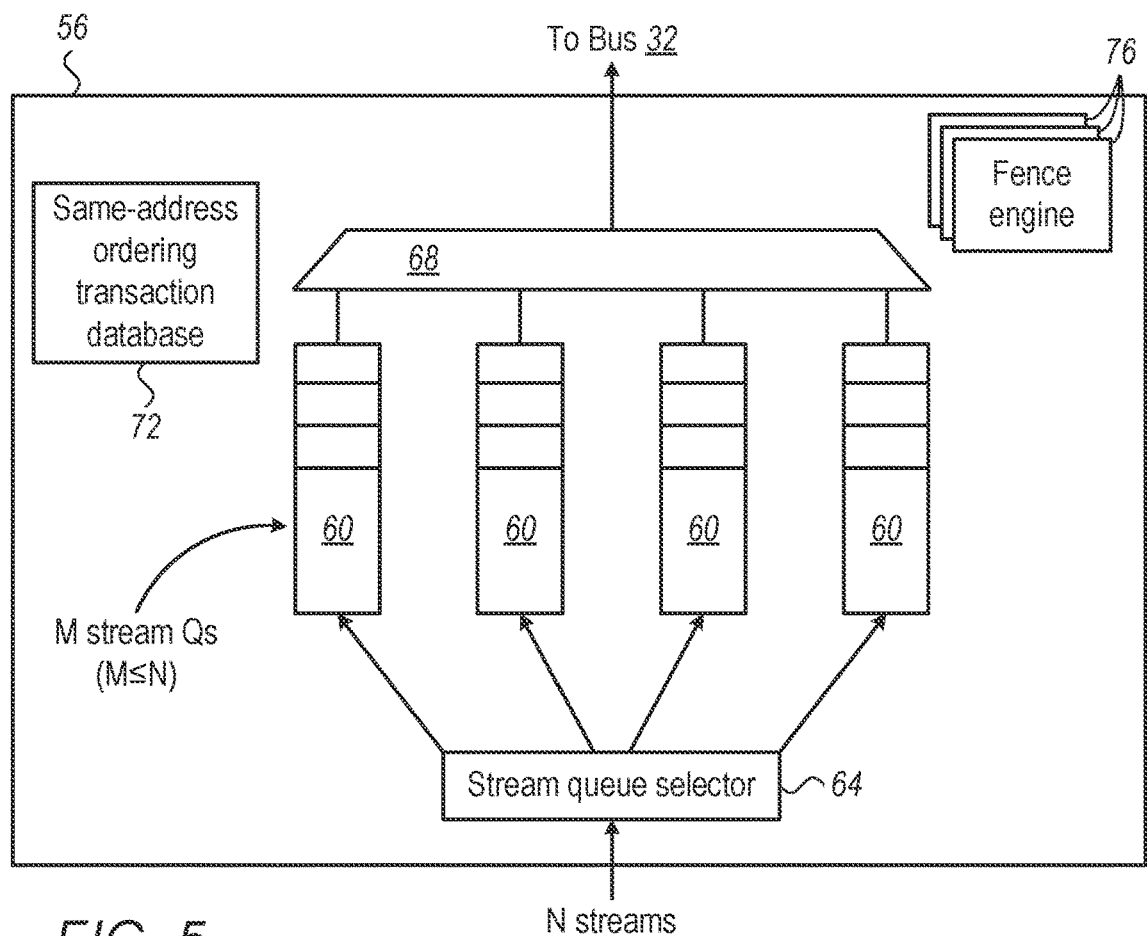
FIG. 5 is a block diagram that schematically illustrates ordering logic in the network adapter of FIG. 4, in accordance with an embodiment of the present invention.

FIG. 5 is a block diagram that schematically illustrates the internal structure of ordering logic 56 in network adapter 24 of FIG. 4, in accordance with an embodiment of the present invention. In this example, logic 56 enforces transaction ordering by inserting fence commands between selected transactions.

Ordering logic 56 of FIG. 5 receives N streams of bus transactions for sending to bus 32. In an example implementation, each bus transaction handled by ordering logic 56 is accompanied by metadata that specifies (i) a stream ID indicative of the stream to which the transaction belongs (from among the N streams), and (ii) an explicit indication of the required type of transaction ordering. The type of transaction ordering may be (i) strict-order, (ii) relaxed-order with same-address ordering (elaborated below), (iii) relaxed-order with same-address ordering for read after write only (not for write after write), or (iv) relaxed-order with no address ordering.

Logic 56 comprises M queues 60 (also referred to as "stream-queues") for queuing the bus transactions, wherein typically M≤N. Each queue 60 is assigned to queue the transactions of one or more respective streams. Logic 56 further comprises a queue selector 64 that routes each incoming bus transaction to the appropriate queue 60. Ordering logic 56 enforces transaction ordering within each queue 60. A multiplexer (MUX) 68 sends the queued transactions from queues 60 to bus 32 (typically to bus interface 44).

The one or more streams assigned to a given queue 60 are also referred to as a "group" of streams. Thus, assigning the N streams of bus transactions to the M queues is also regarded herein as dividing the N streams into M groups.

Similarly, enforcing transaction ordering within a queue is regarded as enforcing transaction ordering within a group of streams. The terms "queue" and "group" are sometimes referred to interchangeably, although queues 60 are only one example implementation of partitioning into groups and enforcing order per group. In alternative embodiments, ordering logic 56 may enforce transaction ordering per group of streams using any other suitable mechanisms or data structures.

As noted above, ordering logic 56 enforces transaction ordering within each queue 60. Transactions assigned to different queues 60 are assumed to be independent, and therefore no ordering is enforced between them. The efficiency of this queue-specific ordering mechanism depends on the ratio between M (the number of queues) and N (the number of streams). When M=N, i.e., when each stream is assigned a dedicated queue, the efficiency is maximal because each stream is ordered independently of other streams.

In practice, however, the number of streams is often too large to allow M=N, in which case each queue is assigned a plurality of streams. When a given queue queues transactions of multiple streams, enforcing strict ordering within the queue may introduce some unnecessary ordering, thereby incurring certain a extent of unnecessary latency. Setting the ratio between M and N is thus a design trade-off.

In an embodiment, logic 56 enforces ordering among the transactions of a given queue by inserting fence commands between selected transactions on that queue. In various embodiments, a fence command may be stream-specific, queue-specific or global. A stream-specific fence command applies to a particular stream and has no effect on other streams. A queue-specific fence command (also referred to as a group-specific fence command) applies to the streams belonging to a particular stream-queue 60 and has no effect on other streams. A global fence command applies to all streams.

When serving the various queues 60, when encountering a fence command, logic 56 stalls all subsequent bus transactions of the streams affected by the command until all previous bus transactions of the streams affected by the command are completed. Depending on the type of fence command being used, the stalled bus transactions may belong to a specific stream, to a group of streams assigned to a specific queue, or to all streams.

In some embodiments, ordering logic 56 comprises a plurality of fence engines 76. Each fence engine 76 supports a single respective fencing session, e.g., it is able to stall, track and resume bus transactions in response to a single respective fence command. If the number of fence engines 76 is sufficiently large, logic 56 is able to maintain full independence between different queues 60.

In practice, however, the number of fence commands that are active at a given time may exceed the number of fence engines 76. In such a case, a requested fence command cannot be executed until a previous fence command is completed and the corresponding fence engine 76 becomes available. This scenario introduces some dependence between queues 60.

The dependence on availability of fence engines 76, and the policy of assigning engines 76, can be viewed as applying "inter-queue rules" or "inter-group rules" by ordering logic 56. One example of a set of inter-queue rules is the following:

Relaxed-order transactions from stream A can progress despite stream B being in a fenced state.

If a fence engine 76 is available, a stream-queue with strict-order transaction can either immediately initiate a new fence session (by an available engine 76) or wait a time period T for other stream-queues to share the same fence session (handled by an existing engine 76).

If all fence engines 76 are in use, all streams-queues which require fencing are stalled, i.e., in head-of-line blocking. Once a fence engine becomes available, all stream-queues waiting for a fence can share the same fence engine.

Within a given stream-queue 60 (i.e., within a given group of streams), ordering logic 56 applies suitable "intra-queue rules" or "intra-group rules". An example of a set of intra-queue rules is the following:

No fencing is required between relaxed-order transactions on the same queue 60. An exception may be transactions for which same-address ordering is specified, as elaborated below.

Each strict-order transaction requires fencing the entire queue 60, that is, flush all previous outstanding transactions.

The configurations of system 20, including the internal configurations of the various network adapters 24, including the internal configurations of processing circuitry 52 and ordering logic 56, as shown in FIGS. 1-5, are example configurations that are chosen purely for conceptual the sake of clarity. In alternative embodiments, any other suitable configurations can be used.

For example, in some embodiments the peripheral device is a Data Processing Unit (DPU), also referred to as a "smart NIC". Such a DPU typically comprises one or more processing devices (e.g., ARM cores) a NIC, and a peripheral bus connecting the processing device(s) and the NIC, all integrated in an Integrated Circuit (IC). In such an embodiment, the peripheral device in the IC may be a relaxed-order bus, and the disclosed techniques can be applied to bus transactions sent between the NIC and the processing device(s) within the IC.

Elements that are not necessary for understanding the principles of the present invention have been omitted from the figures for clarity. The various elements of system 20, including the elements of network adapters 24, may be implemented in hardware, e.g., in one or more Application-Specific Integrated Circuits (ASICs) or FPGAs, in software, or using a combination of hardware and software elements. In some embodiments, certain elements of network adapter 24 may be implemented, in part or in full, using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 6A:
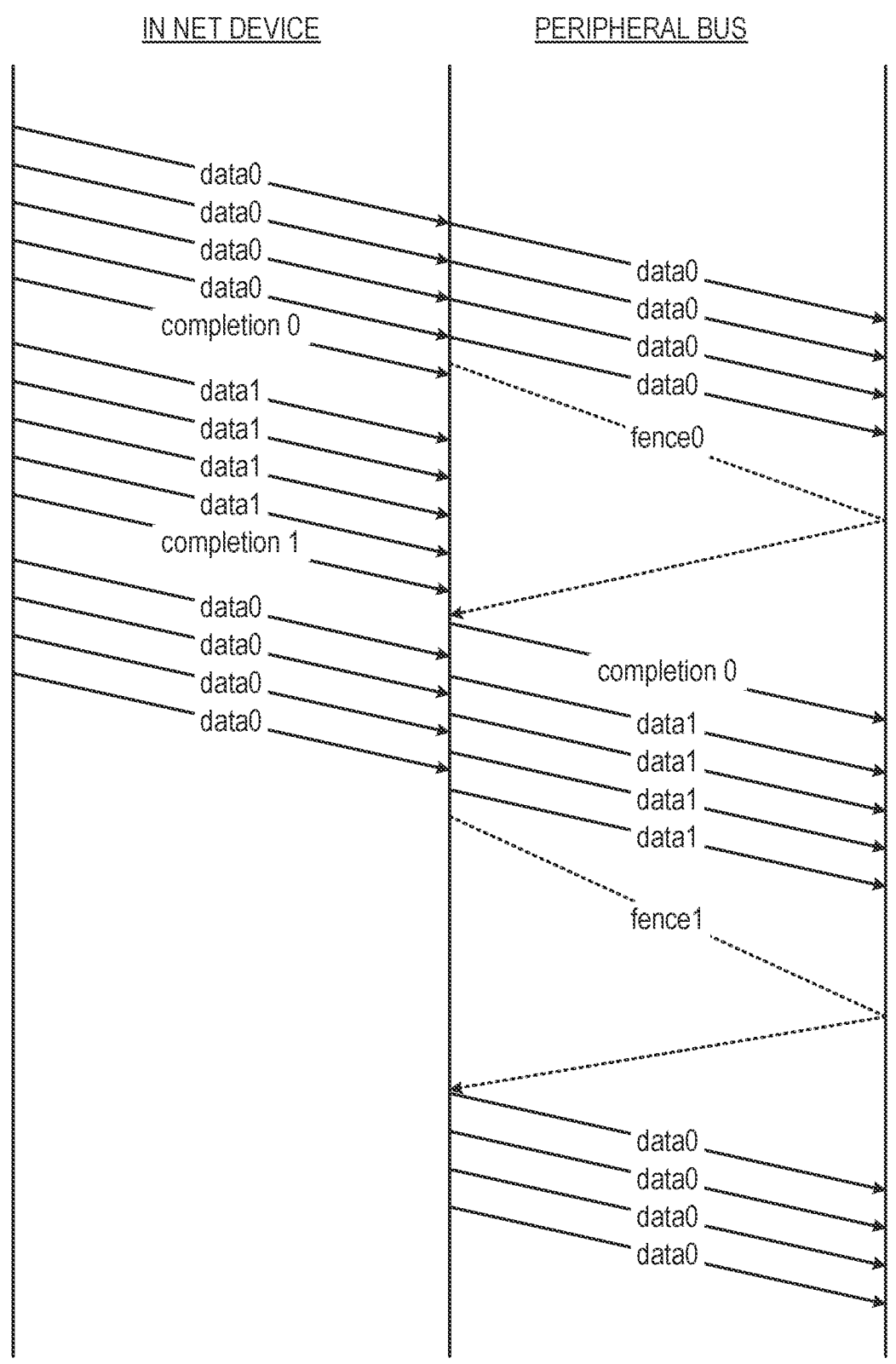
FIGS. 6A and 6B are message diagrams that schematically illustrate stream-specific fencing performed by the ordering logic of FIG. 5, in accordance with embodiments of the present invention.
Figure 6B:
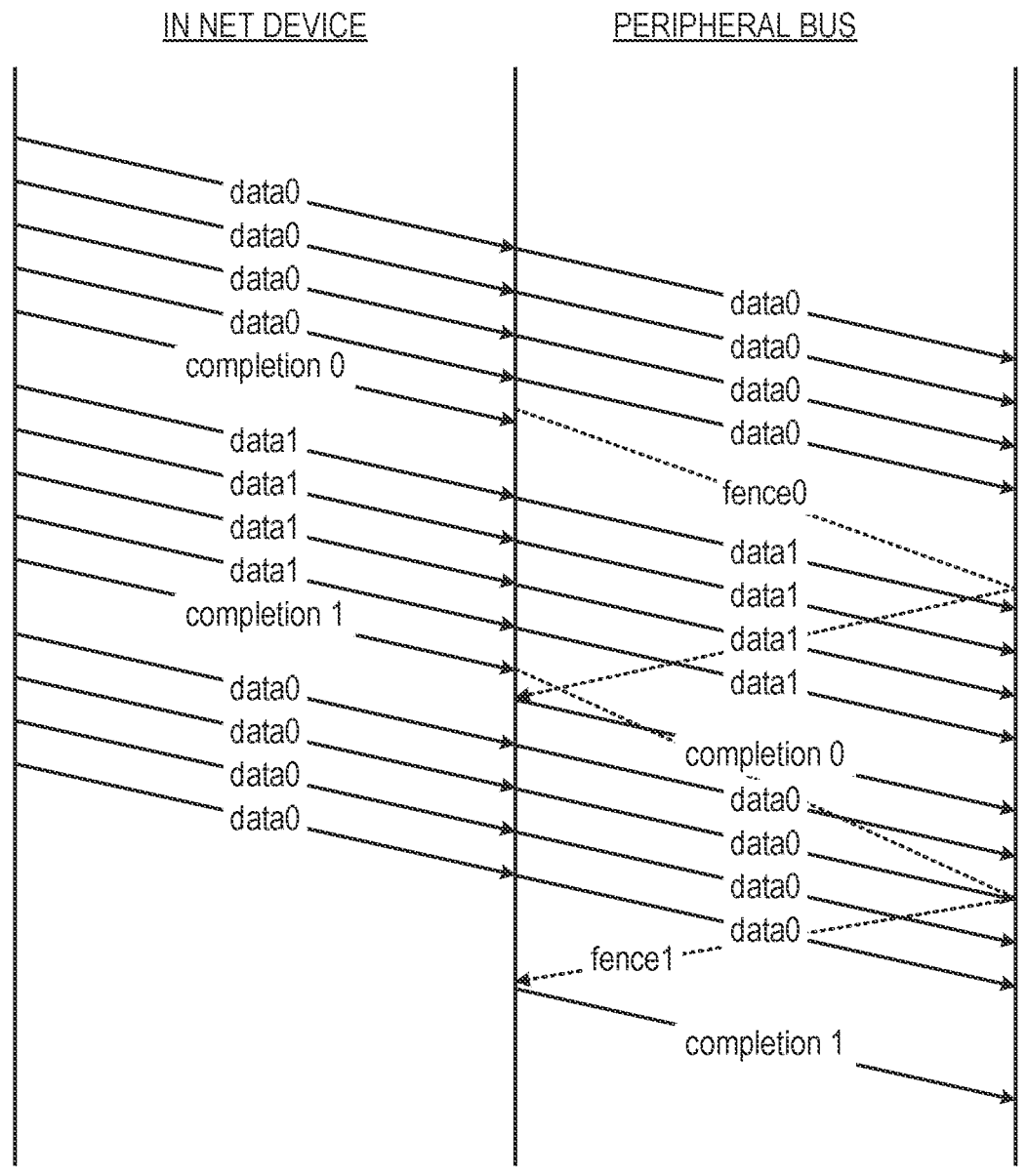

FIGS. 6A and 6B are message diagrams that schematically illustrate stream-specific fencing performed by ordering logic 56 of FIG. 5, in accordance with embodiments of the present invention. In both embodiments, logic 56 handles two streams of bus transactions, numbered "0" and "1". Each stream comprises several data transactions followed by a flag (in the present example a completion, e.g., CQE). The ordering requirement is that subsequent data must be delivered to the processing device only after the preceding completion has been delivered.

In the embodiment of FIG. 6A, both streams are assigned to the same queue 60. In this embodiment, fence commands applied to one stream affect both streams. As seen in the figure, a "fence0" command causes a stall in the transactions of stream 1.

In the embodiment of FIG. 6B, on the other hand, each stream is assigned to a separate queue 60. In this embodiment, fence commands applied to one stream do not affect the other stream. In this implementation, "fence0" commands do not stall the transactions of stream 1, and "fence1" commands do not stall the transactions of stream 0. Comparison between the two figures demonstrates the advantage in latency and throughput gained by using stream-specific fencing using multiple queues.

The use of fence commands is only one non-limiting example of a mechanism for enforcing transaction ordering within a selected stream or group of streams. In other embodiments, any other suitable mechanism can be used. For example, logic 56 may enforce strict ordering within a given stream (or group of streams) by tagging the transactions of the given stream (or group) with a unique tag. At a selected time, instead of inserting an explicit fence command, logic 56 may suspend new bus transactions tagged with the unique tag until the previous transactions tagged with the unique tag are acknowledged.

In various embodiments, queue selector 64 may use various techniques for assigning streams to queues 60 (or otherwise assigning streams to groups). In some embodiments, queue selector 64 assigns the streams to the queues (or otherwise to groups) by applying a suitable hashing function to the stream ID. In other embodiments, queue selector 64 assigns the streams to the queues (or otherwise to groups) by applying one or more group assignment rules.

Same-Address Ordering

When peripheral bus 32 already maintains same-address ordering, no additional same-address enforcement is typically required from logic 56. Otherwise, in some ordering logic 56 applies same-address embodiments, ordering among bus transactions (i.e., ensures that transactions addressing the same address are delivered in-order). Same-address ordering may be applied within a stream and/or between streams (i.e., to transactions belonging to the same stream and/or to transactions belonging to different streams). In some embodiments, logic 56 comprises a same-address ordering transaction database 72 for this purpose.

Consider, for example, an implementation in which peripheral bus 32 is fully relaxed, i.e., does not maintain same-address ordering at all. In an embodiment, database 72 table comprises a tracking for each outstanding non-fenced transaction. If a given stream-queue 60 is requested to send a transaction addressed to the same address as a previous outstanding transaction, an additional fence is required. A single fence can indicate that all previous transactions have been committed, thereby allowing transactions addressed to the same address to be safely issued to bus 32.

In an embodiment, a special case is "counting writes"—See below. These transactions comprise a pair of addresses—one address for data and another address for a flag. The native ordering of bus 32 may enforce ordering for both addresses, for one of the addresses, or for neither of the addresses. If ordering is only natively maintained by bus 32 for one of the addresses, the above mechanism can be used to enforce ordering on the other address.

Stream Selection—Assigning Bus Transactions to Streams

In various embodiments, processing circuitry 52 of network adapter 24 (FIG. 4) apply various stream assignment rules for defining the bus transaction streams, i.e., for assigning bus transactions to streams. In an example embodiment, processing circuitry 52 assigns bus transactions to streams on the basis of disjoint contexts. The term "context" refers to the various bus transactions relating to the inbound messages associated with a given QP, including the inbound messages themselves and the various transactions relating to completions of these messages.

The discovery and configuration of contexts is considered outside the scope of this disclosure. These tasks may be implemented, for example, using an in-band relaxed-order configuration mechanism, using an out-of-band configuration mechanism (e.g., over a separate strict-order peripheral bus, or using a tunneled configuration mechanism (e.g., tunneling of a strict-order bus over the relaxed-order bus).

As described above, the process of executing and reporting completion of an inbound message may comprise the following bus transactions: (i) receiving the message, (ii) posting a work request on a QP (or shared receive queue SRQ), (iii) posting a completion queue element on a CO, (iv) posting a completion event on an EQ, and (v) issuing an interrupt such as a MSI-X. In some cases the process is shorter. For example, in some cases, a QP does not issue completions. In other cases, a CQ does not issue events. In yet other cases, an EQ may not issue an MSI-X.

In many implementations, many-to-one relationships exists between these elements, e.g., (i) multiple QPs may be associated with the same CQ, (ii) multiple CQs may be associated with the same EQ, and/or (iii) multiple EQs may be associated with the same MSI-X. Using these one-to-many relationships, contexts can be arranged logically in groups (e.g., trees) that share common elements. Contexts having no common elements (and therefore belonging to different groups) are referred to as disjoint.

In some embodiments, ordering logic 56 assigns the various bus transactions that belong to a context group to a respective stream. This assignment heuristic is useful since, typically, different CPU processes hold disjoint contexts (QPs, CQs, etc.). In such cases there is no reason to enforce ordering between transactions targeting different CPU processes. EQs and MSI-X, on the other hand, may be assigned per CPU core and not per process. If more than one process is bound to a single CPU core, this may induce inter-process ordering.

Figures 7A, 7B:
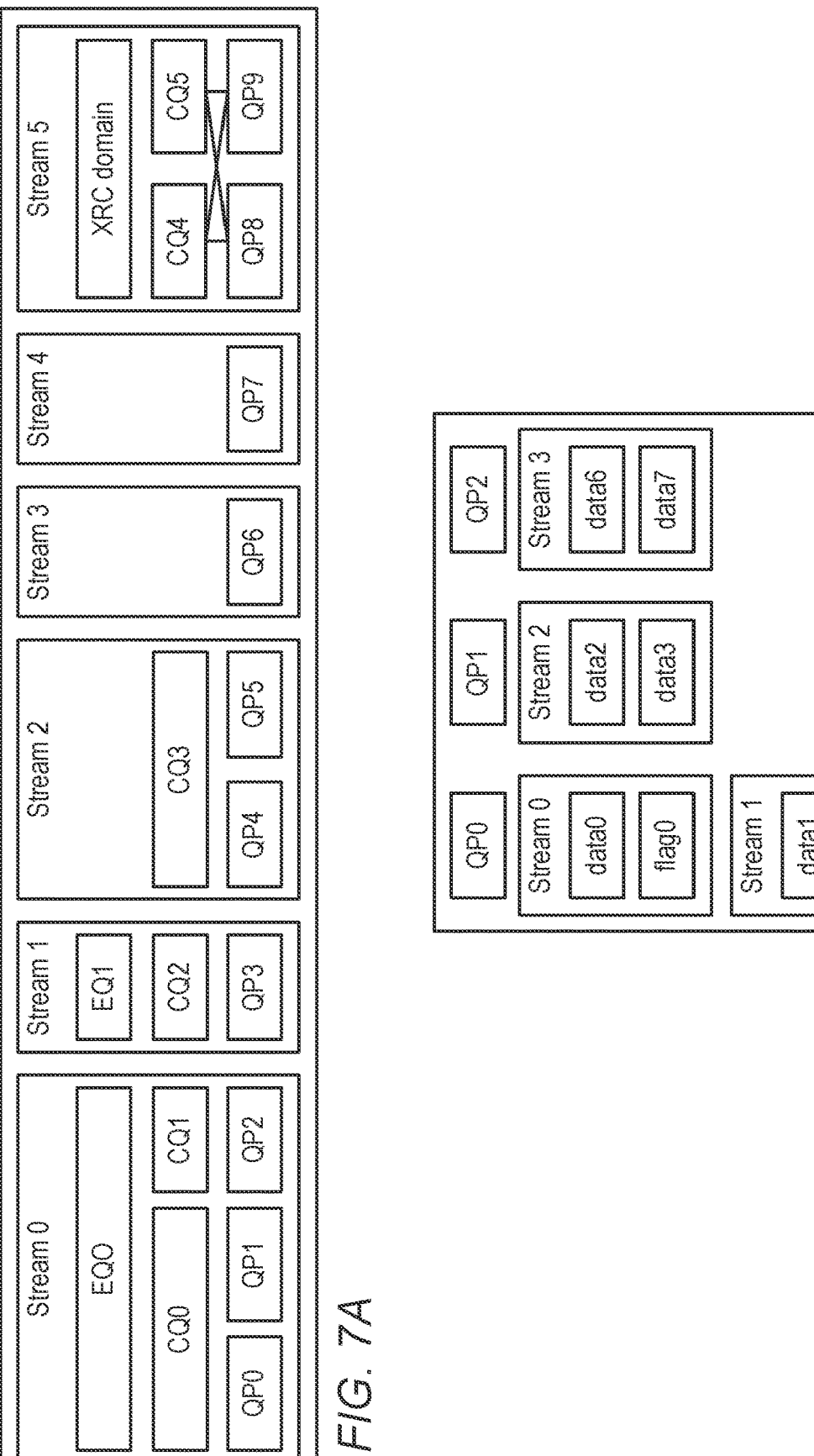
FIGS. 7A and 7B are diagrams that schematically illustrate example bus transactions to streams, in accordance with embodiments of the present invention.

FIG. 7A is a diagram that schematically illustrates an example assignment of bus transactions to streams based on disjoint context, in accordance with an embodiment of the present invention. The present example illustrates the following:

Since QP0, QP1 and QP2 are all indirectly connected to EQ0, logic 56 assigns them to a single stream ("Stream 0").

QP3 is connected to EQ1 and is therefore assigned to a different stream ("Stream 1").

QP4 and QP5 are connected to CQ3, which is not connected to an EQ. These QPs are therefore assigned to a separate stream ("Stream 2").

QP6 and QP7 do not issue CQEs at all, only RDMA transactions. Logic 56 therefore assigns each of these QPs to a respective separate stream ("Stream 3" and "Stream 4", respectively).

QP8 and QP9 are extended reliable connection (XRC) QPs and thus are not bound to a single QP. Therefore, all QPs in the same XRC domain can be assigned to a single stream ("Stream 5" in this example).

In some embodiments, logic 56 modifies the assignments of bus transactions to streams adaptively, based on the actual traffic handled by the network adapter. For example, in some cases a QP may receive a sequence of transactions that do not require a COE. As another example, a sequence of issued CQEs may not require an EQE. In such cases, a static assignment based on context topology may be too restrictive. In an embodiment, logic 56 initially assigns each QP to a separate stream, and similarly each CQ to a separate stream. Then, based on the actual traffic pattern, the initial assignment can be refined. For example, once CQE is required for a certain QP, logic 56 may combine the QP and the CQ to a common stream. The previous stream should typically be flushed before the reassignment. By the same argument, if a period of time without CQEs is encountered, initial logic 56 may revert to the configuration and split the QP and CQ into separate streams. A similar scheme can be applied between CQs and EQs.

In alternative embodiments, logic 56 assigns bus transactions to streams on the basis of disjoint transport transactions. For example, some transport definitions (e.g., Open-Shmem and NVShmem) include unordered semantics, meaning no ordering is required between different transactions unless an explicit fence is issued.

In such cases, for one-sided RDMA (having no CQEs), logic 56 may treat each inbound message as a separate stream. Logic 56 may use any suitable method for associating bus transactions with transport transactions (e.g., RDMA messages). For example, in some implementations the bus transactions may comprise an explicit "message identifier" that indicates the RDMA message to which the bus transaction belongs. See, for example, U.S. patent application Ser. No. 17/902,150, entitled "Payload Direct Memory Storing (PDMS) for Remote Direct Memory Access (RDMA)," filed Sep. 2, 2022.

FIG. 7B is a diagram that schematically illustrates an example assignment of bus transactions to streams based on disjoint RDMA transactions, in accordance with an embodiment of the present invention. In this example, bus transactions "data0", "flag0", "data1" and "flag1" arrive on QP0; bus transactions "data2" and "data3" arrive on QP1; and bus transactions "data6" and "data7" arrive on QP2. Although "data0", "flag0", "data1" and "flag1" all arrive on the same QP, for the transport semantics being used they can be split into separate streams ("Stream0" and "Stream1").

Improved Stream-Queue Operation Using
Sub-Queues

In the embodiment of FIG. 5 above, the bus transactions of one or more streams are queued in a given stream-queue 60. In some case this assignment may not be optimal, even if it is possible to assign a separate stream-queue 60 to every single stream.

For example, despite belonging to the same stream, data typically does not need to wait for CQE or for certain kinds of flags (for instance, while WRITE transactions need to wait for subsequent ATOMIC transactions, WRITE transactions do not need to wait for new kinds of transactions such as "atomic write" or CQEs). Similarly, a COE typically does not need to wait for an EQE.

Thus, in some embodiments logic 56 partitions a given stream-queue 60 into multiple sub-queues. A given sub-queue is dependent on progress of another sub-queue reaching a particular transaction. This implementation retains the independent progress of each stream-queue 60 as described above, but further optimizes the progress within the stream-queue.

Figure 8:
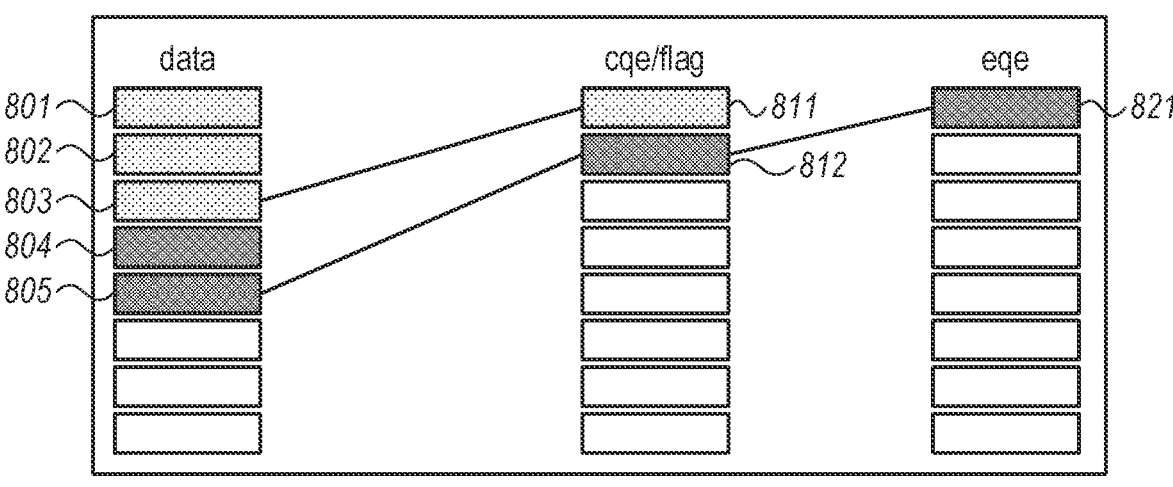
FIG. 8 is a diagram that schematically illustrates partitioning of a stream-queue into sub-queues, in accordance with an embodiment of the present invention.

FIG. 8 is a diagram that schematically illustrates partitioning of a stream-queue into sub-queues, in accordance with an embodiment of the present invention. In the present example, a given stream-queue (e.g., any of queues 60 of FIG. 5 above) is implemented using three sub-queues denoted "data", "CQE/flag" and "EQE". Each sub-queue is used for queuing the corresponding type of bus transactions (data transactions, CQEs/flags and EQEs).

Logic 56 serves the bus transactions at the heads of the sub-queues. Any suitable arbitration scheme can be used between the sub-queues, e.g., serving the oldest transaction that can progress (i.e., the oldest transaction that is not waiting for fencing of a previous dependent transaction). In this manner, bus transactions that do not depend on previous bus transactions within the stream-queue can progress, even if the transaction at head of the stream-queue is stalled due to a fence.

In some embodiments, a stream is divided into multiple sub-streams, and explicit dependencies are specified between the sub-streams. This structure enables ordering logic 56 to process the stream more efficiently using sub-queues.

In an example embodiment, in addition to specifying a stream ID, each bus transaction entering logic 56 (FIG. 5) also specifies the following:

A transaction ID.

A sub-stream ID identifying the sub-stream (within the current transaction).

Sub-stream dependency—An indication of which prior transaction the current transaction is dependent on.

For example, referring to FIG. 8, data may be assigned to sub-stream 0, CQE to sub-stream 1 and EQE to sub-stream 2. In the present example, the data transactions queued in sub-queue 0 (the left-most sub-queue denoted "data") are numbered 801-805, the CQEs/flags queued in sub-queue 1 (the middle sub-queue denoted "CQE/flag") are numbered 811-812, and the EQE queued in sub-queue 2 (the right-most sub-queue denoted "EQE") is numbered 821.

When pushing the light-shaded CQE (811) to the middle sub-queue, the CQE (811) explicitly references the bottom-most light-shaded data transaction (803) on sub-stream 0, etc. These references enable ordering logic 56 to resolve the dependencies between the progress of sub-streams (or sub-queues).

Since ordering logic 56 typically handles sub-queues rather than sub-streams, in some embodiments transaction ordering numbering is reassigned from a per-sub-stream domain to a per-sub-queue domain. For example, referring to FIG. 8, even though the light-shaded and dark-shaded transactions in the middle sub-queue (sub-queue 1, denoted "CQE/flag") may belong to separate streams, the light-shaded CQE (811) at the head of the middle sub-queue is waiting for {sub-queue0, transaction2} (the bottommost light-shaded data transaction (803) posted on the left-hand side sub-queue), and the dark-shaded CQE (812)_posted on the middle sub-queue is waiting for {sub-queue 0, transaction 1} (the bottommost dark-shaded data transaction (805) posted on the left-hand side sub-queue), since both are being pushed to the same sub-queue, the transaction for which the CQE/flag are waiting can be reassigned to {sub-queue0, transaction3} and {sub-queue0, transaction5}, respectively.

Since subsequent transactions rely on prior transaction ordering, in some embodiments ordering logic 56 maintains a table that translates between the client numbering (e.g., {stream 18, sub-stream0, transaction 0}) to ordering-logic numbering (e.g., {stream-queue 7, sub-queue0, transaction 1}).

Transaction Ordering Using Counting Writes

In some embodiments, the relaxed-order peripheral bus supports "counting write" bus transactions (also referred to as "flagged write" transactions). In the present context, a "counting write" transaction is a transaction that atomically (i) writes data to a certain address and (ii) writes a flag (e.g., "data valid") or increments a write counter in another address. When using counting write transactions, the peripheral bus ensures that the flag is written (or the write counter is incremented) only after the data has been written, even though the two writes are addressed to different addresses. Typically, however, no order is guaranteed between separate counting write transactions.

Consider a relaxed-order peripheral bus that supports counting write transactions and also ensures same-address ordering. When using a completion counter mechanism over this bus, transaction ordering (e.g., fencing) is still required between data (e.g., read/atomic responses) and writing to the completion counter. This requirement incurs a latency penalty. In some embodiments, ordering logic 56 optimizes this mechanism using counting write transactions.

For example, for small-size data (smaller than the maximal payload size of the peripheral bus), a counting write may be used instead of a write. While this scheme does not avoid the need for a fence between completions, it avoids the need of a fence between data and completion, thus reducing latency.

As noted above, a counting write transaction comprises a write with two addresses—the data address and the write counter address. For these transactions, same-address ordering should be preserved for the write counter address. If the relaxed-ordered bus natively maintains same-address ordering only for the data address, then the same-address ordering mechanism described above can be utilized specifically for counter writes. Even for implementations that do not support same-address ordering enforcement mechanisms, the latency penalty for the first transaction, due to fence between data and counter writes, is still avoided.

Furthermore, assuming the counter counts the number of bytes being completed, the counting write mechanism can be used to avoid the need for fencing between data and CQEs altogether. For read responses, this can be referred to as a "counting read" or "counting get" operation, since from the software's perspective the read responses are associated with a counter. See, for example, U.S. patent application Ser. No. 17/977,910, entitled "Remote Direct Memory Access Operations with Integrated Data Arrival Indication," filed Oct. 31, 2022.

Completion-Queue and Completion-Counter
Use-Cases

As another example, consider the case of using a completion queue mechanism over a relaxed-order peripheral bus. Unlike the completion counter, a completion queue involves writing individual entries. In such a scenario, several optimizations can be used. For example, the network adapter interface protocol can be configured so that the completion entries must be consumed in order. This avoids the need to order CQE writes. A fence is still required between data and CQE, and between CQE and EQE writes when applicable. As another example, peripheral buses often have some level of atomicity, e.g., aligned writes of up to one cache line (e.g., 128B) are written to memory atomically. This property may be utilized for writing a large group of completions atomically, instead of fencing between each one. This solution holds even when the software consumes completions out of order. As yet another example, a model can be defined in which each completion entry can indicate multiple previous completions (e.g., completion entry is for m requests, from work_request index (n) to (n+m−1)). With this definition, a coalescing mechanism can be implemented (e.g., if subsequent write data is pending, wait for prior data to complete and send a single completion indicating multiple requests). Since completions may contain data or metadata, not only work completion indications, a coalescing session may be terminated once metadata needs to be written.

In an alternative embodiment, ordering logic 56 uses a "completion counter per operation" mechanism. This solution can be viewed as a hybrid between a completion counter and a completion queue entry. A completion counter per operation (or group of operations) may be software-defined. For example, the work request itself can indicate a counter location. Alternatively, a completion counter per operation may comprise a predefined array of counters, whereby each counter corresponds to a single work request. Since each transaction is completed using a separate (fixed or user-defined) counter, no ordering is required between completions.

Data Read/Write Ordering

RDMA READ or ATOMIC responses (WRITE) may be read by subsequent work requests. In some cases, the reads are expected to be delivered in-order by the peripheral bus, with respect to the subsequent writes. However, as long as the network adapter issues the peripheral bus read transaction (associated with the RDMA WRITE source data) after issuing the peripheral bus write transaction (associated with the RDMA READ response data), which would be required in order for the above to work, regardless of the peripheral bus ordering semantics-no race condition exists due to same-address ordering.

Figure 9:
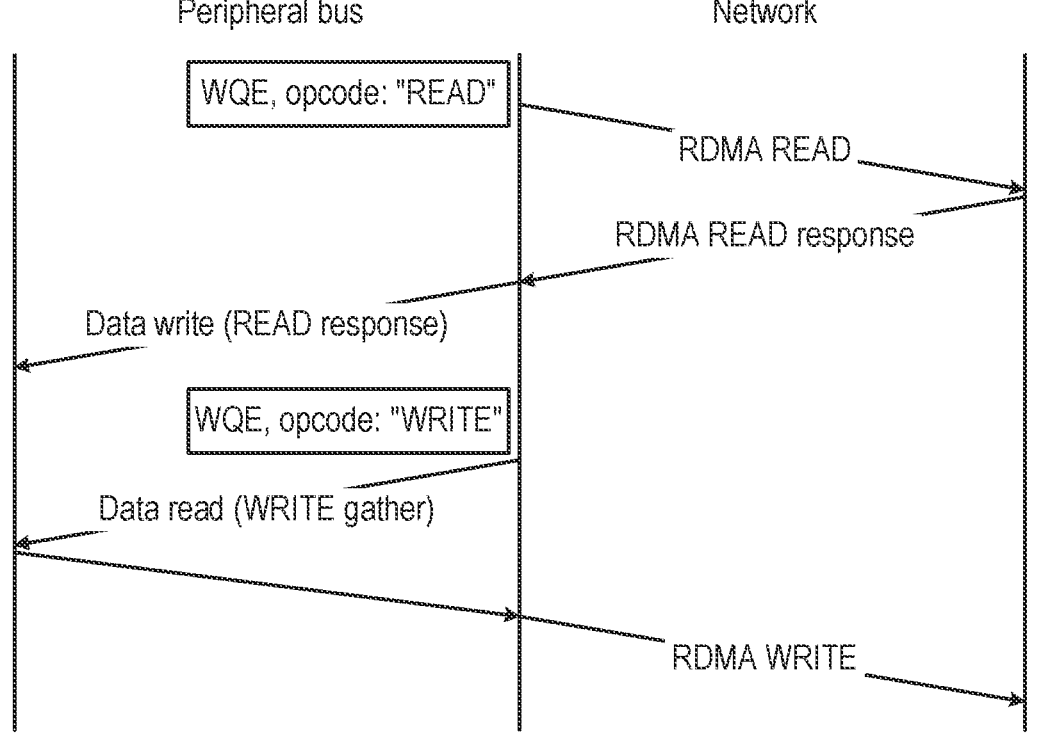
FIG. 9 is a message diagram that schematically illustrates data read/write ordering, in accordance with an embodiment of the present invention.

FIG. 9 is a message diagram that schematically illustrates data read/write ordering, in accordance with an embodiment of the present invention.

As seen in the figure, the network adapter issues the data write after the data read operation. As long as this condition is maintained, same-address ordering will ensure consistency.

In some embodiments, the above condition is enforced using a suitable software-defined mechanism, such as the IB spec work request "fence" indication that explicitly requests a WRITE to wait for a prior READ. In other embodiments, the order can be enforced using a suitable cross-channel mechanism such as "core direct". Such a mechanism is described, for example, in "CORE-Direct—The Most Advanced Technology for MPI/SHMEM Collectives Offloads," Mellanox Technologies Technology Brief, May 2010. In yet other embodiments, the order can be enforced using explicit memory synchronization, as described, for example, in U.S. Patent Application Publication 2021/0406179.

Responder-Side Transaction Ordering

The examples described above referred mostly to the operation of a requestor network adapter (e.g., operation of network adapter 24A over relaxed-order bus 32A in FIG. 1). The techniques described above, however, are not limited to the requestor side and can also be used in a similar manner in a responder network adapter (e.g., network adapter 24B communicating over relaxed-order bus 32B).

For example, the responder network adapter is typically also required to guarantee in-order delivery of data and completion notifications (i.e., to ensure that a completion is visible across the peripheral bus only after the corresponding data is fully visible). The RDMA specification, for example, requires that completion (generated either for a RDMA WRITE with IMMEDIATE operation, or for a SEND operation which may in turn be sent after an RDMA WRITE operation) guarantees visibility of prior data. Many of the techniques for in-order delivery of completion notifications, described above with respect to the requestor network adapter, can be used in the responder network adapter, as well. One difference is that, unlike the requestor network adapter, the responder network adapter typically has no information as to the number of inbound bytes. Solutions that are applicable when the inbound data size is known are described further below.

Some of the requestor-side solutions described above can also be used to maintain write/atomic ordering on the responder side. One way to signal data arrival is by issuing an RDMA atomic operation after the RDMA WRITE. In an example implementation, the responder network adapter sends an atomic ADD operation, which increments a software-defined counter, similarly to the completion counter described with respect to the requestor network adapter. In the responder network device, too, an ordering issue remains between the data write and a subsequent data write. Solutions to this issue are similar to the work completion ordering techniques described with respect to the requestor network adapter.

In other embodiments, the "completion counter per operation" mechanism, described with respect to the requestor network adapter, can also be used.

In an alternative embodiment, if counting write operations are supported by the relaxed-order peripheral bus, then this can be utilized as described, for example, in U.S. patent application Ser. No. 17/977,894, entitled "Remote Direct Memory Access Operations with Integrated Data Arrival Indication," filed Oct. 31, 2022. In this solution, a write transaction comprises both a data address and a counter address, whereby the counter is incremented by the number of bytes written to the data address. The target will not consume the data until the counter has reached a specified value.

Since counter incrementation is a commutative operation, the target is not dependent on the order of data writes to the peripheral bus (the peripheral bus itself will ensure that the counter update is committed only once updated data is visible).

Each data transaction is initiated by a work request, translated to one or more network packets, and finally written to target memory over the peripheral bus.

An end-to-end counting write operation implies that both the work request, the network packets, and peripheral bus transactions are all able to express counting writes. Since no ordering is required in-order for transaction to complete correctly—this removes any need for fencing or other expensive operations by the peripheral device.

Some of the requestor-side solutions described above can also be used to maintain write/write ordering on the responder side. The most complex case would be for two regular RDMA WRITE messages, since there is nothing differentiating the first as "data" and the second as a "flag". In some embodiments, the responder network adapter support full WRITE-after-WRITE ordering by using the stream-specific fencing technique described above. In an example embodiment, a configuration is added to individual queues that desire this semantic.

Some of the requestor-side solutions described above can also be used to maintain write/read ordering on the responder side. For example, there may be a need to ensure ordering of an RDMA READ (or ATOMIC) after RDMA WRITE. This sort of ordering is typically resolved, however, when the peripheral bus supports same-address ordering.

Although the embodiments described herein mainly address a peripheral device connected to a relaxed-order peripheral bus, the methods and systems described herein can also be used in hybrid configurations that include both a relaxed-order peripheral bus and a strict-order peripheral bus. For example, a single peripheral bus may support both strict-order and relaxed-order semantics (e.g., some PCIe configurations are able to support both ordered and unordered transport on separate virtual channels). As another example, a single peripheral device may be connected to multiple peripheral buses of different types, e.g., PCIe and Nvlink. In some configurations the strict-order peripheral bus may have a lower bandwidth than the relaxed-order peripheral bus.

In some embodiments, a peripheral device can use such a hybrid configuration efficiently in various ways. In one embodiment, writes originating from write/write ordered queues may utilize the strict-order bus, due to high serialization penalty. In another embodiment, CQEs/EQEs/MSI-X, which typically use less bandwidth than data, may be sent on the strict-order peripheral bus. In this implementation, data is typically sent on the relaxed-order peripheral bus using the disclosed stream-aware fencing technique. CQEs, EQEs and MSI-Xs, however, may be posted to the strict-order bus without additional fencing overheads.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A peripheral device, comprising:
a bus interface, to exchange bus transactions over a peripheral bus that permits out-of-order transfer of at least some of the bus transactions; and
circuitry, to:
generate a plurality of streams of the bus transactions;
assign the plurality of streams to two or more groups, thereby selecting, from among the plurality of streams, a given group of the streams for which transaction ordering is required;
enforce the transaction ordering among the bus transactions of the given group; and
send the bus transactions via the bus interface to the peripheral bus.

2. The peripheral device according to claim 1, wherein the circuitry is to enforce the transaction ordering in the given group by inserting one or more fence commands into the bus transactions of the streams belonging to the given group.

3. The peripheral device according to claim 2, wherein one or more of the fence commands are group-specific fence commands that apply only to the given group.

4. The peripheral device according to claim 2, wherein, in response to detecting that a number of currently-processed fence commands exceeds a defined maximal number, the circuitry is to stall processing of any group that requires insertion of a new fence command.

5. The peripheral device according to claim 1, wherein the circuitry is to enforce the transaction ordering in the given group by tagging the bus transactions of the given group with a unique tag, and, at a selected time, suspending new bus transactions tagged with the unique tag until previous transactions tagged with the unique tag are acknowledged.

6. The peripheral device according to claim 1, wherein the circuitry is to assign the streams to the groups by queuing the bus transactions in two or more queues associated respectively with the two or more groups.

7. The peripheral device according to claim 1, wherein the circuitry is to enforce the transaction ordering by applying one or more intra-group ordering rules to the bus transactions belonging to the given group.

8. The peripheral device according to claim 1, wherein, in addition to the transaction ordering within each of the groups, the circuitry is to enforce selective transaction ordering among bus transactions belonging to different groups, in accordance with one or more inter-group ordering rules.

9. The peripheral device according to claim 1, wherein the circuitry is to assign the streams to the groups in accordance with one or more group assignment rules.

10. The peripheral device according to claim 1, wherein the circuitry is to assign the bus transactions to the streams in accordance with one or more stream assignment rules.

11. The peripheral device according to claim 1, wherein the peripheral bus, which permits the out-of-order transfer, comprises two or more separate bus links that each require in-order transfer of at least some of the bus transactions.

12. The peripheral device according to claim 1, wherein the peripheral device is a network adapter that is to communicate over the peripheral bus with a processing device, for coupling the processing device to a network.

13. The peripheral device according to claim 12, wherein the circuitry is to send or receive communication packets over the network in accordance with a Remote Direct Memory Access (RDMA) protocol.

14. The peripheral device according to claim 1, wherein the bus interface is to communicate over the peripheral bus with a processing device, and wherein the circuitry is to enforce the transaction ordering in a selected stream by applying one or more ordering rules defined between the peripheral device and a device driver running in the processing device.

15. A method, comprising:
generating, in a peripheral device, a plurality of streams of bus transactions for transmission over a peripheral bus that permits out-of-order transfer of at least some of the bus transactions;
assign the plurality of streams to two or more groups, thereby selecting, from among the plurality of streams, a given group of the streams for which transaction ordering is required;
enforcing, in the peripheral device, the transaction ordering among the bus transactions of the streams given group; and sending the bus transactions from the peripheral device to the peripheral bus.

16. A peripheral device, comprising:

a bus interface, to exchange bus transactions over a peripheral bus that permits out-of-order transfer of at least some of the bus transactions; and circuitry, to:

generate a plurality of streams of the bus transactions;

select, from among the plurality of streams, a stream for which transaction ordering is required;

enforce the transaction ordering among the bus transactions of the selected stream by tagging the bus transactions of the selected stream with a unique tag, and, at a selected time, suspending new bus transactions tagged with the unique tag until previous transactions tagged with the unique tag are acknowledged; and send the bus transactions via the bus interface to the peripheral bus.

* * * * *